(12) United States Patent
Mukund et al.

(10) Patent No.: US 8,289,542 B2
(45) Date of Patent: Oct. 16, 2012

(54) DISTRIBUTED LIMIT-BASED ACCOUNTING FOR PRINT JOBS

(75) Inventors: Vanditha Mukund, Penfield, NY (US); Kenneth James Buck, Webster, NY (US)

(73) Assignee: Xerox Corporation, Norwalk, CT (US)

(*) Notice: Subject to any disclaimer, the term of this patent is extended or adjusted under 35 U.S.C. 154(b) by 927 days.

(21) Appl. No.: 11/900,502

(22) Filed: Sep. 12, 2007

(65) Prior Publication Data
US 2009/0070372 A1 Mar. 12, 2009

(51) Int. Cl.
G06F 3/12 (2006.01)
G03G 21/02 (2006.01)
G03G 15/00 (2006.01)

(52) U.S. Cl. ............ 358/1.15; 399/79; 399/80; 707/610
(58) Field of Classification Search .................. 358/1.15; 399/79, 80; 707/610
See application file for complete search history.

(56) References Cited

U.S. PATENT DOCUMENTS

| | | | |
|---|---|---|---|
| 6,374,262 B1 | 4/2002 | Kodama | |
| 6,597,469 B1* | 7/2003 | Kuroyanagi | 358/1.15 |
| 6,611,849 B1 | 8/2003 | Raff | |
| 6,892,210 B1* | 5/2005 | Erickson et al. | 1/1 |
| 7,055,050 B2 | 5/2006 | Domon | |
| 2005/0117176 A1* | 6/2005 | Benz et al. | 358/1.15 |
| 2005/0186003 A1 | 8/2005 | Heiney et al. | |
| 2005/0213115 A1 | 9/2005 | Johnson et al. | |
| 2005/0216514 A1* | 9/2005 | Murata | 707/104.1 |
| 2007/0070397 A1* | 3/2007 | Shimoichi | 358/1.15 |

* cited by examiner

Primary Examiner — Twyler Haskins
Assistant Examiner — Fred Guillermety
(74) Attorney, Agent, or Firm — Fay Sharpe LLP (57) ABSTRACT

A system updates at least one database and includes at least one slave print device, a master print device having the database or a server having the database, and at least one network accessing mechanism communicating with the slave print device and with master print device or the server via a network for administration of the database. A method is disclosed for updating at least one database. The method includes providing at least one slave print device and a master print device having the database or a server having the database; and at least one network accessing mechanism communicating with the slave print device and with the master print device or the server via a network for administration of the database. The slave print device initiates updating the database of the master print device and/or the server. The slave print device may or may not have a database.

24 Claims, 5 Drawing Sheets

DISTRIBUTED LIMIT-BASED ACCOUNTING FOR PRINT JOBS

CROSS-REFERENCE TO RELATED APPLICATIONS

This application is related to commonly owned and concurrently filed U.S. patent application Ser. No. 11/900,517 by K. J. Buck et al., entitled "LOCAL COST COMPUTATION ACCOUNTING FOR A PRINT JOB"; U.S. patent application Ser. No. 11/900,501 by K. J. Buck et al., entitled "LOCAL COST COMPUTATION ACCOUNTING FOR A PRINT JOB"; U.S. patent application Ser. No. 11/900,506 by K. J. Buck et al., entitled "DATA PROCESSING CARD BASED COPY BILL PAYMENT CAPABILITY"; U.S. patent application Ser. No. 11/900,503 by K. J. Buck et al., entitled "DATA PROCESSING CARD BASED COPY BILL PAYMENT CAPABILITY"; and U.S. patent application Ser. No. 11/900,531 by V. Mukund et al., entitled "UNIFIED ADAPTABLE ACCOUNTING SYSTEM", the entire contents of each of which is incorporated by reference herein.

BACKGROUND

1. Technical Field

The present disclosure relates to accounting systems and methods, and more particularly, to accounting methods and machines for effecting accounting control for print jobs.

(As defined herein, a print job is print output from a device that produces a print output, e.g., a copier, a scanner, a facsimile machine, a printer, a multifunction device (MFD) or other suitable image forming device. As defined herein, a print job is also an action by, or a function of, a device that produces a copy-to-file, a print-to-file, a scan-to-file, a facsimile-to-file, and a multifunction device or other suitable image forming device performing the same actions or functions to file.)

2. Description of Related Art

The inventors have recognized that current accounting methods for print devices, e.g., multi function devices (MFD), have been implemented as one-off stand alone methods resulting in methods that do not integrate well and are difficult and time consuming to administer.

Some of the smaller print devices with lower processing capacity and small or no disk memory are unable to administer any form of control on the number of pages marked by the device, and can at best review the usage on a device.

Even if the device were capable of having a sufficient disk memory, since the devices behave as independent entities, each device is unaware of usage accrued on another print device by a particular user or account. Overcoming the lack of awareness of total usage proves challenging when trying to implement user-based limits across a set of print devices. Due to the distributed nature of the accounting (run independently on each print device), users may reach the usage limit on one print device but submit and process a print job on another print device instead, thereby being able to cheat the system.

The inventors have recognized that lack of definite control over the usage limits for print jobs is a problem that is experienced by all types of business and organizations, ranging from small to large entities.

SUMMARY

To advance the state of the art of methods for accounting for print job usage quotas and limits, the present disclosure relates to a system for updating at least one database. The system includes at least one slave print device, at least one of a master print device having the at least one database and a server having the at least one database, and at least one network accessing mechanism. The at least one network accessing mechanism communicates with the at least one slave print device and with the master print device or the server via a network for administration of the at least one database. The system may be configured wherein upon a user requesting a print job at the at least one slave print device, the at least one slave print device requests a user record from the at least one database of the master print device and/or the server, and upon receiving the user record, the at least one slave print device creates a temporary account with temporary account information for the print job. The temporary account information may include information of authentication data for the user and usage updating data.

The at least one slave print device may process the print job and initiate updating the at least one database of the master print device and/or the at least one database of the server. Following the at least one slave print device processing the print job and initiating updating the at least one database of the master print device and/or the at least one database of the server, the at least one slave print device may discard the temporary account information. Prior to the at least one slave print device discarding the temporary account information, the at least one slave print device may inform the master print device and/or the server that the at least one slave print device has no database to update. The at least one slave print device may include at least one database, wherein the at least one slave print device processes the print job and updates the at least one database of the at least one slave print device.

Following the at least one slave print device processing the print job and updating the at least one database of the at least one slave print device, the at least one slave print device may initiate updating at least one of the at least one database of the master print device and the at least one database of the server. Additionally, the system may be configured wherein upon a user requesting a print job at the master print device, the master print device processes the print job and updates the at least one database on the master print device. The master print device may initiate updating the at least one database of the at least one slave print device having a database with an account corresponding to an account residing in the master print device. The updating of the at least one database of the master print device and/or the at least one database of the server may be performed by adjusting device usage counters and total usage counters for specified attributes. Additionally, the updating of the at least one database of the at least one slave print device may be performed by adjusting device usage counters and total usage counters for specified attributes.

The present disclosure relates also to a method for updating at least one database. The method includes providing at least one slave print device; providing at least one of a master print device having the at least one database or a server having the at least one database; and providing at least one network accessing mechanism. The at least one network accessing mechanism communicates with the at least one slave print device and with the at least one of the master print device and the server via a network for administration of the at least one database. The method may include a user requesting a print job at the at least one slave print device, whereupon the at least one slave print device requests a user record from the at least one database of the master print device and/or the server and, upon receiving the user record, the at least one slave print device creates a temporary account with temporary account information for the print job. The temporary account information may include information of account identification data for the user and usage updating data. The method may further include the at least one slave print device processing the print job and initiating updating one of the at least one database of the master print device and the at least one database of the server. Following the at least one slave print device processing the print job and initiating updating the at least one of the database of the master print device and the database of the server, the method may further include the at least one slave print device discarding the temporary account information. The method may include, prior to the at least one slave print device discarding the temporary account information, the at least one slave print device informing the master print device and/or the server that the at least one slave print device has no database to update. Wherein the at least one slave print device includes at least one database, the method may further include the at least one slave print device processing the print job and updating the at least one database of the at least one slave print device. Following the at least one slave print device processing the print job and updating the at least one database of the at least one slave print device, the method may further include the at least one slave print device initiating updating at least one of the at least one database of the master print device and the at least one database of the server.

The method may also further include a user requesting a print job at the master print device, and the master print device processing the print job and updating the at least one database on the master print device. The method may further include the master print device initiating updating the at least one database of the at least one slave print device having a database with an account corresponding to an account residing in the master print device. The updating of the at least one database of the master print device or the at least one database of the server may be performed by adjusting device usage counters and total usage counters for specified attributes. Similarly, the updating of the at least one database of the at least one slave print device may be performed by adjusting device usage counters and total usage counters for specified attributes.

BRIEF DESCRIPTION OF THE DRAWINGS

Various embodiments of the present disclosure will be described herein below with reference to the figures wherein.

DETAILED DESCRIPTION

The present disclosure relates to a distributed system having a network of print devices which employ a master-slave approach to synchronizing or updating print job user record databases (containing user information related to authentication, authorization, and accounting) on an individual print device in the case where the print device can host a database. One of the print devices is designated the master print device, while the other print devices are designated as the slave print devices. As defined herein, a print device refers to a device that produces a print output, e.g., a copier, a scanner, a facsimile machine, a printer, a multifunction device (MFD) or other suitable image forming device. Alternatively, a print device refers to a device that produces a copy-to-file, a print-to-file, a scan-to-file, a facsimile-to-file, and a multifunction device or other suitable image forming device performing the same functions to file. A print device may include an internal processor capable of hosting a database, e.g., a master print device, a slave print device having at least one database, or a slave print device not having a database.

The present disclosure relates also to a distributed system having a network of print devices which also employ a master-slave approach to synchronizing or updating print job user record databases (containing user information related to authentication, authorization, and accounting) on an individual print device in the case where the print device can host a database. However, instead of the master being a print device, the master is now a server. The slaves are all print devices. The interaction logic between the master and slaves is the same as for the system described above.

The present disclosure may also relate to a distributed system wherein the print devices do not have the capability to host a database by configuring the Master to host the entire database, while the slaves merely act as a cache for temporary account information or accounting data stored only for the duration of the session that is being run.

As described above, the method of the present disclosure employs a master-slave approach for synchronization or updating of databases. As described below in more detail, in one embodiment, the distributed system includes two to about five print devices, where each print device is capable of hosting a database. One print device is identified as the master with the remaining print devices being identified as slaves. When an account in the database on one print device gets updated, an update action is launched that updates the databases on all print devices. If the first print device is a slave print device, the slave informs the master about its update. The master updates the database on itself as well as the databases on all the other slaves. If the first print device is the master print device, the master updates all slaves after its own update. In one embodiment, the databases on all the print devices are identical, thereby leading to easier administration, since all changes can be made on the master database and cloned to the databases of the slave print devices.

In one embodiment, the databases on the slave print devices are different from each other and/or different from the database hosted on the master print device. In this situation, the master database is a superset of all the slave databases. Therefore, the databases are dynamically updatable so that a new temporary account can be created on the local database if a particular user requesting the print job does not have an account on that database. A network accessing mechanism, e.g., a browser, may be employed to administer the databases. Thus, at least one print device is capable of hosting the database with the remainder of the print devices in the network being slave print devices with or without databases residing thereon.

Depending on anticipated usage, a master print device may not have the capability/bandwidth to service the slave print devices adequately, in which case a central processing unit (CPU) or server replacing the master print device may be employed. Furthermore, depending on the number of print devices that need to be managed, the server capacity of a system configured with a relatively large number of print devices or of a system that is designed for relatively large usage or high volume may be different from the server capacity of a system configured with a relatively small number of print devices or of a system that is designed for relatively small usage or low volume.

The database on the print device may contain, based on user identity (User identification (ID), Account ID, etc.), the allowed quotas for controlled attributes such as color copies, color prints, copies in general, prints in general, etc., as well as the prior usage on that print device for each controlled attribute and the total usage across all the devices in the connected set for each controlled attribute.

In one embodiment wherein the slave databases are not identical to the master database, and wherein an authenticated user (the authentication database need not be the same as the accounting database) submits a print job request to a slave print device that is not the normally used device for that user, the slave database creates a temporary account for the user, requests and receives the quotas and total usage values for the controlled attributes from the server and then process the job. Upon completion of the job/session, the slave print device updates its own database and communicates current usage to the master print device, which in turn updates the database of the master print device based on the current usage. The slave print device then purges the temporary account.

In one embodiment wherein the slave print devices do not have the capability of hosting a full-fledged database, the slave print devices maintain a cache memory for the duration of the job/session wherein the usage counters are being incremented. At the end of the job/session, the usage is communicated to the master print device by the slave print device, the master record is updated by the master, and the cache memory on the slave is freed to receive data for another job/session.

In one embodiment, some of the slave print devices communicating via the network are high-end devices capable of hosting databases, while other slave print devices communicating via the network are low end devices, not capable of hosting databases.

Figure 1:
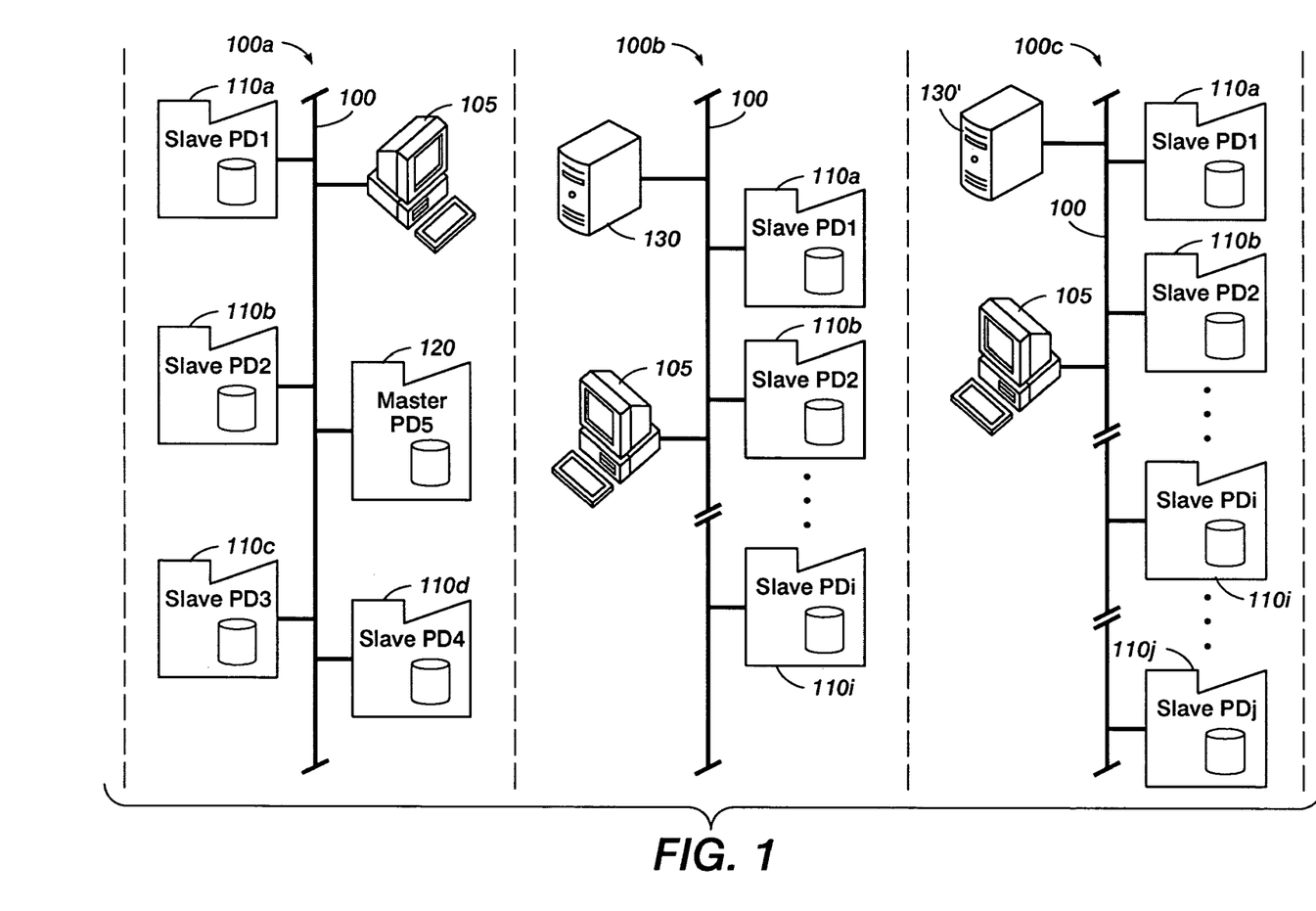
FIG. 1 illustrates systems of slave print devices having either a master print device that stores a database or a server that stores a database according to the present disclosure.

More particularly, FIG. 1 illustrates a distributed system, e.g., system 100a, 100b or 100c, for updating at least one database. In one embodiment of the present disclosure, system 100a includes at least one slave print device, and as illustrated, four slave print devices 110a, 110b, 110c and 110d, and a master print device 120 having at least one database (not shown), with the slave print devices 110a, 110b, 110c and 110d communicating with the master print device 120 via a network 100.

The system 100a also includes at least one network accessing mechanism 105 that communicates with the at least one slave print device, e.g., with slave print devices 110a, 110b, 110c and 110d, and with the master print device 120 via the network 100, for administration of the at least one database of the master print device 120 and the slave print devices 110a through 110d.

In one embodiment, referring again to FIG. 1, system 100b includes at least one slave print device, and as illustrated, a plurality of slave print devices 110a, 110b, through 110i, and a server 130 having at least one database (not shown), with the slave print devices 110a through 110i communicating with the server 130 via the network 100 for administration of the at least one database. System 100b also includes at least one network accessing mechanism, e.g., network accessing mechanism 105, that communicates with the at least one slave print device, e.g., with slave print devices 110a through 110i and with the server 130 via the network 100, for administration of the at least one database of the server 130 and the at least one slave print device, e.g., slave print devices 110a through 110i. It is contemplated that the number i may be a number of slave print devices up to about 50 and the number j may be a number of slave print devices greater than about 50.

In one embodiment, referring yet again to FIG. 1, system 100c includes at least one slave print device, and as illustrated, a plurality of slave print devices 110a, 110b . . . 110i, through 110j (where i may again be a number of slave print devices up to about 50 and where j may be a number of slave print devices greater than about 50) and a server 130' having at least one database (not shown), with the slave print devices 110a through 110j communicating with the server 130' via the network 100 for administration of the at least one database. System 100c also includes at least one network accessing mechanism, e.g., network accessing mechanism 105 that communicates with the at least one slave print device, e.g., with slave print devices 110a through 110j and with the server 130' via the network 100, for administration of the at least one database of the server 130'.

System 100c is essentially identical to system 100b except that the server 130' has a larger memory and operation capacity than server 130 to accommodate a larger number of slave print devices 110a through 110j as compared to the server 130 of system 100b. Similarly, the network 100 and network accessing mechanism 105 may also now have a larger memory and operating capacity to accommodate the larger number of slave print devices 110a through 110j.

Figure 2A:
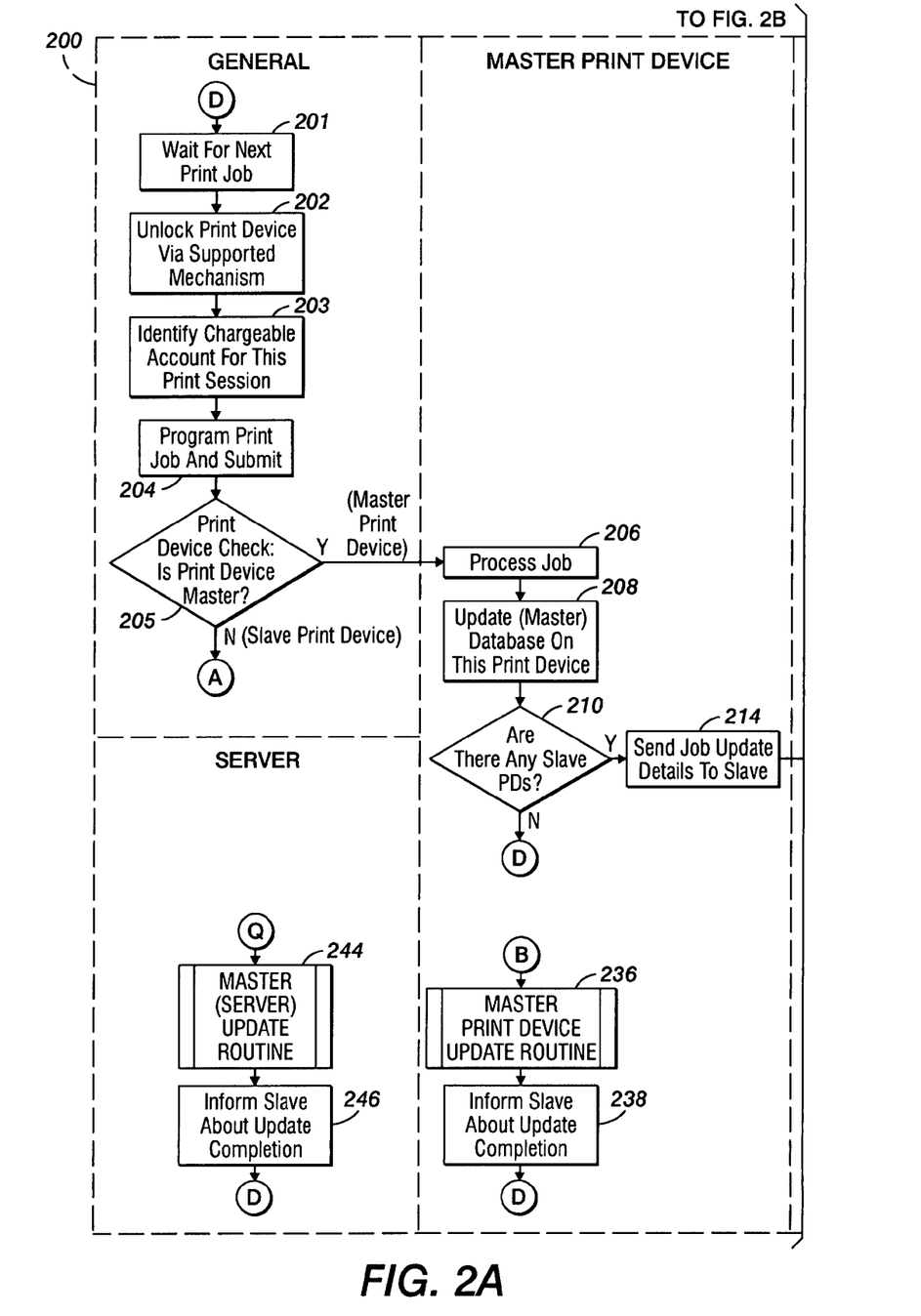
FIG. 2A is a logic flow diagram for the method of operation of the systems of slave print devices and master print device or server of FIG. 1.
Figure 2B:
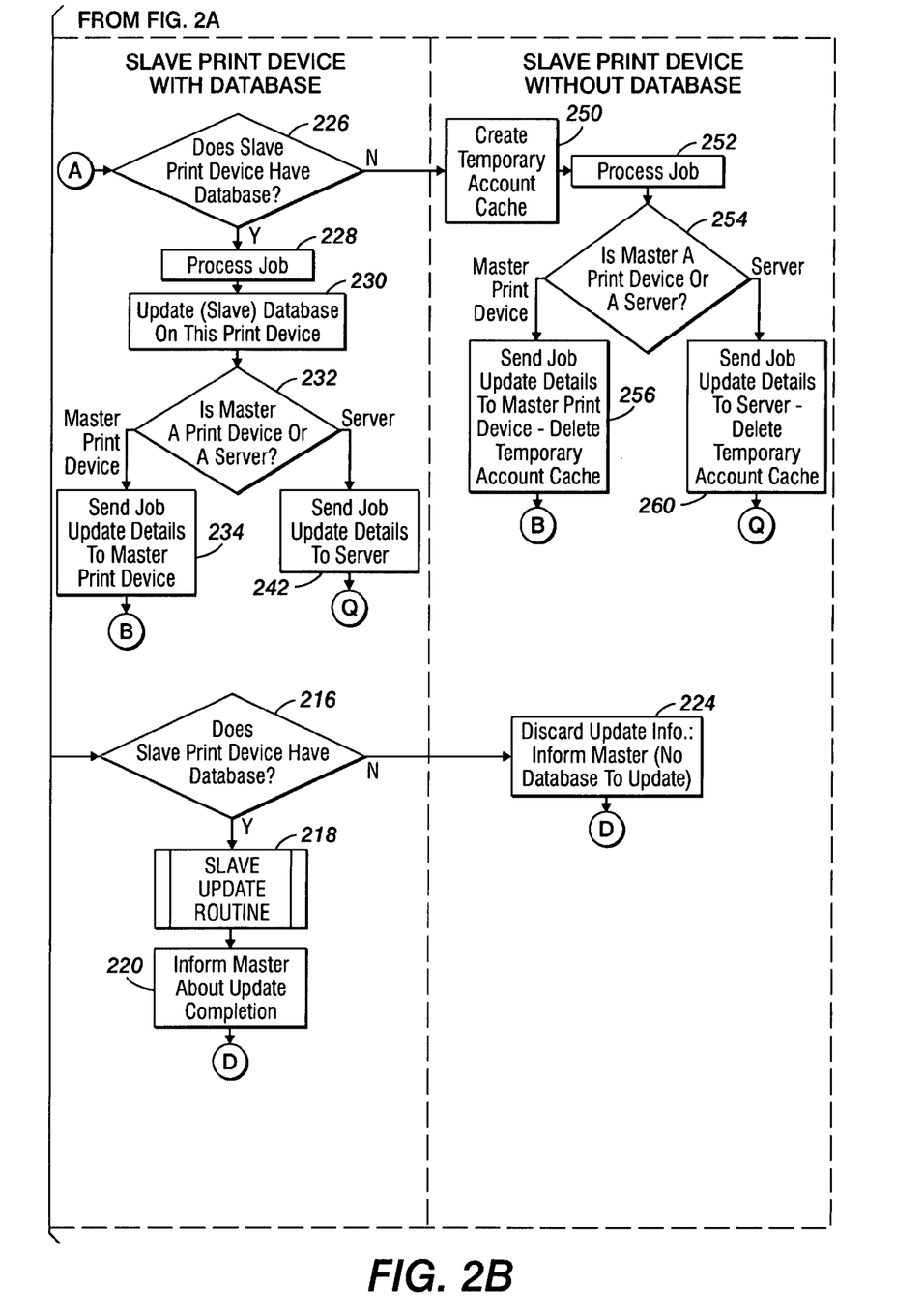
FIG. 2B is a continuation of the logic flow diagram of FIG. 2A.

Referring now to FIGS. 2A and 2B, there is disclosed a method logic flow diagram for the operation of the systems 100a, 100b or 100c of slave print devices and master print device or server of FIG. 1. More particularly, referring to FIGS. 2A and 2B in conjunction with FIG. 1, method 200 begins at a continuation point D and includes a step 201 of a system wait condition that includes the system 100a, 100b or 100c waiting for a print job or the next print job. In step 202, a user unlocks a print device, e.g., slave print devices 110a through 110i or 110j or master print device 120, via a supported mechanism for unlocking the particular print device. Step 203 includes identifying a chargeable account for the particular print job session. Step 204 includes a user requesting a print job by programming a print job at at least one print device, e.g., slave print devices 110a through 110i or 110j or master print device 120, and submitting the print job. In decision step 205, the system 100a, 100b or 100c determines whether the print device is a master print device, e.g., master print device 120 having at least one database. If yes, step 206 is implemented of the master print device 120 processing the print job followed by step 208 of the master print device 120 updating its own database(s), i.e., the at least one database of the master print device 120. Following the updating of the at least one database of the master print device 120, decision step 210 is implemented of determining whether there are any slave print devices, e.g., slave print devices 110a through 110d, on the network 100 having an account corresponding to the account corresponding to the account residing in the master print device 120. If no, step 201 is implemented to transfer the master print device 120 to the system wait condition of waiting for the next print job request (continuation point D). If yes, step 214 is implemented of the master print device 120 sending the print job update details to at least one slave print device, e.g., slave print devices 110a through 110d. At decision step 216, it is determined whether the slave print device(s), e.g., slave print devices 110a through 110d, have a database. If yes, step 218 is implemented wherein upon the master print device 120 processing the print job and updating the at least one database on the master print device 120, the master print device 120 initiates updating of at least one slave having a database, e.g., slave print devices 110a through 110d, having a database with an account corresponding to the account residing in the master print device 120.

Following step 218 of completion of the updating of the at least one database of the at least one slave print device, step 220 is implemented of the at least one slave print device, e.g., slave print devices 110a through 110d, informs the master print device 120 of the completion of the updating of the at least one database, and the master print device 120 transfers via continuation point D to step 201 of the system wait condition of waiting for the next print job request. Similarly, step 201 is implemented of the at least one slave print device, e.g., slave print devices 110a through 110d, transferring to the system wait condition of waiting for the next print job request (continuation point D).

Returning to decision step 216, if it is determined that the slave print device(s), e.g., slave print devices 110a through 110d, do not have a database, step 224 is implemented of the at least one slave print device, e.g., slave print devices 110a through 110d, discarding the update information received from the master print device 120 since the at least one slave print device, e.g., slave print devices 110a through 110d, has or have no database to update, and informing the master print device 120 that the at least one slave print device, e.g., slave print devices 110a through 110d, has or have no database and transferring via continuation point D to step 201 to the system wait condition of waiting for the next print job request.

Returning now to decision step 205, wherein the system 100a, 100b or 100c determines whether the print device is a master print device, e.g., master print device 120 having at least one database, if the print device is not a master print device, e.g., master print device 120, and is therefore a slave print device, decision step 226 is implemented, via continuation point A, of determining whether the slave print device, e.g., slave print devices 110a through 110i or through 110j, has or have at least one database. If yes, step 228 is implemented of the at least one slave print device, e.g., slave print devices 110a through 110i or through 110j, processing the print job, after which step 230 is implemented of the at least one slave print device, e.g., slave print devices 110a through 110i or through 110j, updating the at least one database of the at least one slave print device, e.g., slave print devices 110a through 110i or through 110j.

Upon completion of the print job via step 230, decision step 232 is implemented of determining whether the at least one slave print device, e.g., slave print devices 110a through 110i or through 110j, is associated with a master print device or a server, e.g., master print device 120 or server 130 or 130' (see FIG. 1), e.g., it is determined whether the master is a print device or a server.

If it is determined via decision step 232 that the at least one slave print device, e.g., slave print devices 110a through 110i or through 110j, is associated with a master print device, e.g., master print device 120, step 234 is implemented of the at least one slave print device, e.g., slave print devices 110a through 110i or through 110j, initiating updating of the at least one database of the master print device, e.g., master print device 120, by transferring the update information to the master print device, e.g., master print device 120 via continuation point B. Following step 234 of the transfer of the update information to the master print device, e.g., master print device 120, step 236 is implemented of the master print device, e.g., master print device 120, performing a master database update routine (continuation point B). Upon completion of step 236 of the master print device, e.g., master print device 120, performing the master database update routine, step 238 is implemented of the master print device, e.g., master print device 120, informing the at least one slave print device, e.g., slave print devices 110a through 110i or through 110j, of the completion of the updating of the at least one master database.

Returning to decision step 232, if it is determined via decision step 232 that the at least one slave print device, e.g., slave print devices 110a through 110i or through 110j, is associated with a server, e.g., server 130 or 130', step 242 is implemented of the at least one slave print device, e.g., slave print devices 110a through 110i or through 110j, initiating updating of the at least one database of the server, e.g., server 130 or 130', by transferring the update information to the server, e.g., server 130 or 130' via continuation point Q to step 244. Following step 242 of the transfer of the update information to the server, e.g., server 130 or 130', step 244 is implemented of the server, e.g., server 130 or 130', performing a server database update routine (continuation point Q). Upon completion of step 244, step 246 is implemented of the server, e.g., server 130 or 130', informing the at least one slave print device, e.g., slave print devices 110a through 110i or through 110j, of the completion of the updating of the database of the at least one server, e.g., server 130 or 130', followed by implementing step 201 by the at least one slave print device, e.g., slave print devices 110a through 110d or 110i or 110j, transferring via continuation point D to step 201 of the system wait condition of waiting for the next print job request.

Returning again to decision step 205, wherein the system 100a, 100b or 100c determines whether the print device is a master print device, e.g., master print device 120 having at least one database, if the print device is not a master print device, e.g., master print device 120, and is therefore a slave print device, decision step 226 is implemented, via continuation point A, of determining whether the slave print device, e.g., slave print devices 110a through 110i or through 110j, has or have at least one database. If no, step 250 is implemented of the at least one slave print device, e.g., slave print devices 110a through 110i or through 110j, creating a temporary account cache of user information, which may include information of authentication data for the user and usage updating data or other suitable or desired accounting information. Following step 250, step 252 is implemented of the at least one slave print device, e.g., slave print devices 110a through 110i or through 110j, processing the print job and recording accounting data. Upon completion of the print job via step 252, decision step 254 is implemented of determining whether the at least one slave print device, e.g., slave print devices 110a through 110i or through 110j, is associated with a master print device or a server, e.g., master print device 120 or server 130 or 130' (see FIG. 1).

If it is determined via decision step 254 that the at least one slave print device, e.g., slave print devices 110a through 110i or through 110j, is associated with a master print device, e.g., master print device 120, step 256 is implemented of the at least one slave print device, e.g., slave print devices 110a through 110i or through 110j, initiating updating the at least one database of the master print device, e.g., master print device 120, by transferring the update information to the master print device, e.g., master print device 120 via continuation point B and discarding the temporary account cache information defined above. Following step 256 of the transfer of the update information to the master print device, e.g., master print device 120, step 236 is implemented by the master print device, e.g., master print device 120, performing a master database update routine (continuation point B).

Upon completion of step 236 of the master print device, e.g., master print device 120, performing the master database update routine, step 238 is implemented of the master print device, e.g., master print device 120, informing the at least one slave print device, e.g., slave print devices 110a through 110i or through 110j, of the completion of the updating of the at least one master database, followed by implementing step 201 by the at least one slave print device, e.g., slave print devices 110a through 110i or 110j, transferring via continuation point D to step 201 of the system wait condition of waiting for the next print job request.

Returning to decision step 254, if it is determined that the at least one slave print device, e.g., slave print devices 110a through 110i or through 110j, is associated with a server as a master, e.g., server 130 or 130' (see FIG. 1), step 260 is implemented of the at least one slave print device, e.g., slave print devices 110a through 110i or through 110j, initiating the updating of the at least one database of the server, e.g., server 130 or 130', by transferring the update information to the server, e.g., server 130 or 130', via continuation point Q, and discarding the temporary account cache information defined above. Following step 260 of the transfer of the update information to the server, e.g., server 130 or 130', step 244 is implemented of the server, e.g., server 130 or 130', performing a server database update routine (continuation point Q).

Upon completion of step 244 of the server, e.g., server 130 or 130', performing the server database update routine, step 246 is implemented of the server, e.g., server 130 or 130', informing the at least one slave print device, e.g., slave print devices 110a through 110i or through 110j, of the completion of the updating of the at least one database of the server, e.g., server 130 or 130', discarding the temporary account information, followed by implementing step 201 of the at least one slave print device, e.g., slave print devices 110a through 110i or 110j, transferring via continuation point D to step 201 of system wait condition of waiting for the next print job request.

Figure 3A:
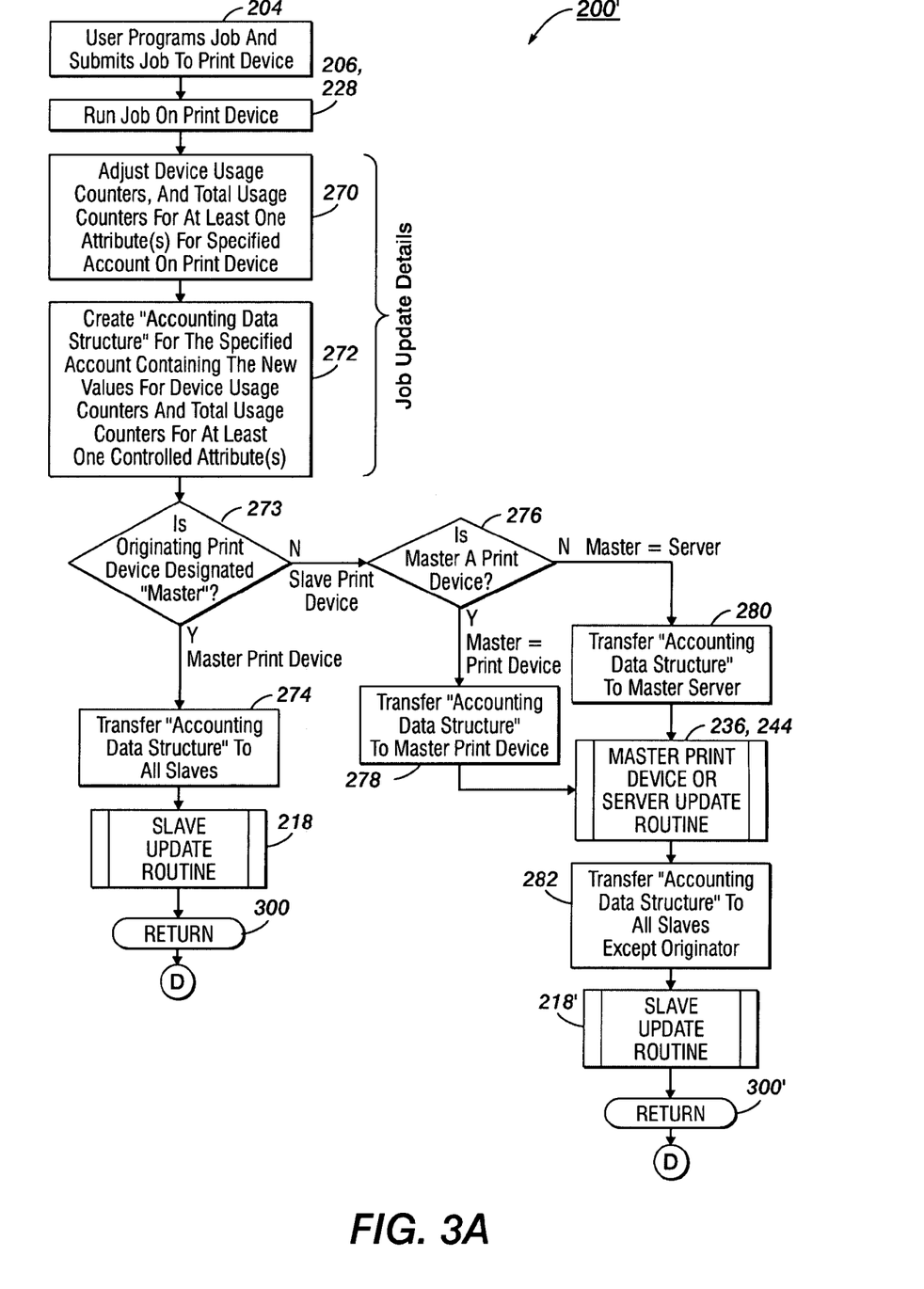
FIG. 3A is a condensed logic flow diagram for the detailed operational interaction between at least one slave print device and a master print device or server according to the present disclosure.
Figure 3B:
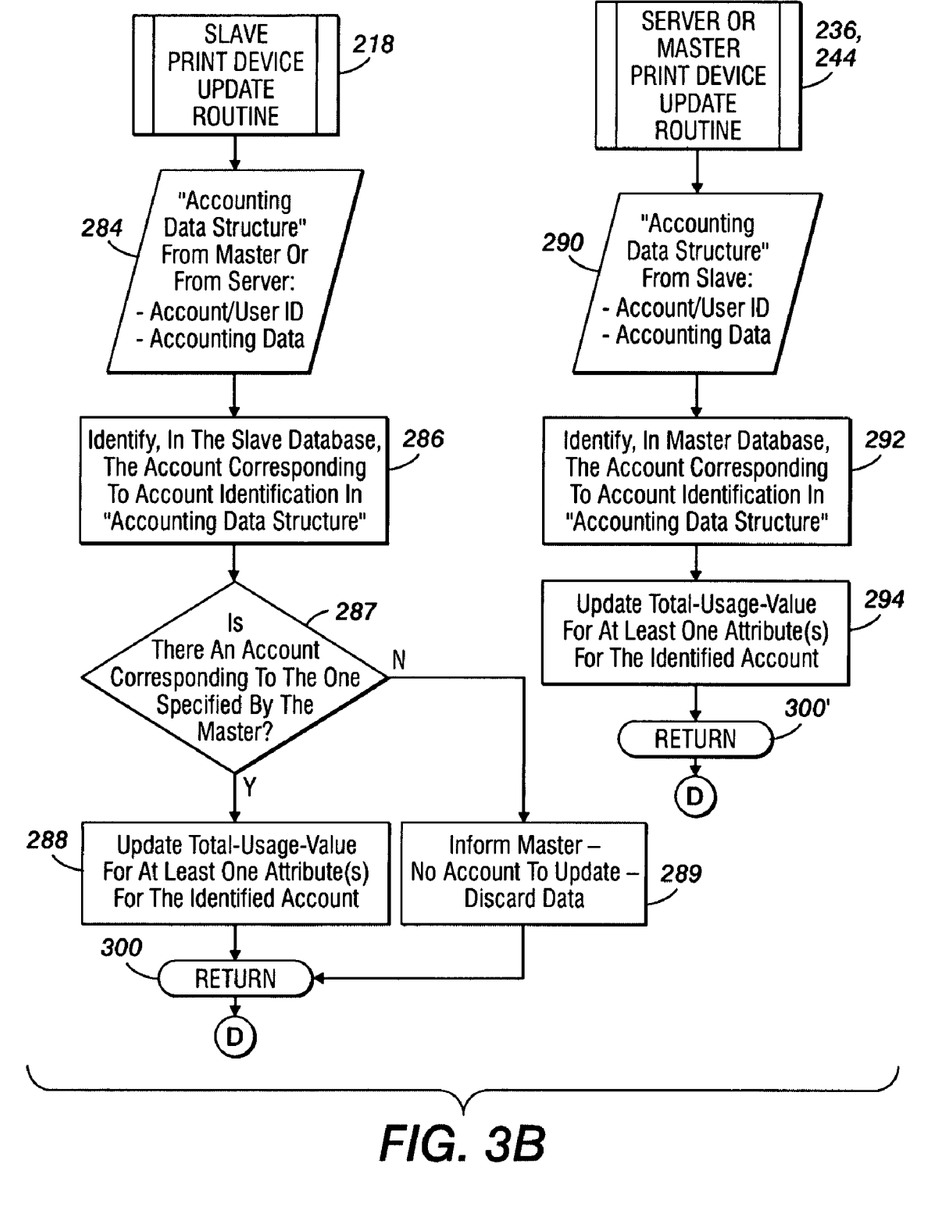
FIG. 3B is a detailed logic flow diagram related to the condensed logic flow diagram of FIG. 3A for database update routines of at least one slave print device and a master print device or server according to the present disclosure.

Referring now to FIGS. 3A and 3B in conjunction with FIGS. 2A and 2B, FIG. 3A is a condensed logic flow diagram for the detailed operational interaction between at least one slave print device and a master print device or server according to the present disclosure, while FIG. 3B is a detailed logic flow diagram related to the condensed logic flow diagram of FIG. 3A for database update routines of at least one slave print device and a master print device or server according to the present disclosure. More particularly, method 200' includes the step 204 (see FIG. 2A) of a user requesting a print job by programming a print job at at least one print device, e.g., slave print devices 110a through 110i or 110j or master print device 120. Step 206 or 228 is then implemented of running or processing a print job on a print device, e.g., master print device 120 or at least one slave print device such as slave print devices 110a through 110i or through 110j.

Detailed operational step 270 is then implemented of the updating of the at least one database of the at least one slave print device, e.g., slave print devices 110a through 110i or 110j, at least one database of the master print device, e.g., master print device 120, and/or the at least one database of the server, e.g., server 130 or 130', is performed by adjusting device usage counters and total usage counters for specified attributes. As described above, the database on the particular print device or server is expected to contain, based on user identity (User ID, Account Id, etc.), the allowed quotas for controlled attributes such as color copies, color prints, copies in general, prints in general, etc., as well as the usage on that print device for each controlled attribute and the total usage across all the devices in the network or connected set for each controlled attribute. As defined herein, adjusting of the device usage counters includes either incrementing or decrementing the device usage counters as well as resetting the device usage counters. The increment or decrement may be a number, e.g., an integral number applied to number of prints or copies, a fractional number or other suitable number or metric.

Step 272 is then implemented of creating an "accounting data structure" for the specified user account containing the new values for device usage counters and total usage counters for at least one controlled attribute. The combination of steps 270 and 272 may be defined as the job update details.

Decision step 205 (see FIG. 2A) may be implemented generically in step 273 by determining if the originating print device(s), e.g., slaves 110a through 110d or 110a through 110i or 110j, or master 120, is/are designated as a master print device. If yes, step 274 is implemented by transferring the "accounting data structure" to all slaves having a database, e.g., slaves 110a through 110i or 110j. Following step 274, step 218 may be implemented by the at least one slave print device, e.g., slave print devices 110a through 110d or 110a through 110i or 110j, updating its own database, e.g., the at least one database of the at least one slave print device, e.g., slave print devices 110a through 110d or 110a through 110i or 110j.

Referring now to FIG. 3B, step 218 includes step 284 of the at least one slave print device, e.g., slave print devices 110a through 110i or 110j, receiving the "accounting data structure" containing account identification, user identification and accounting data from the master print device, e.g., master print device 120, or from the server, e.g., server 130 or 130'. Additionally, step 218 includes step 286 of identifying in the slave database the account corresponding to the account identification in the "accounting data structure" containing account identification, user identification and accounting data.

In decision step 287, it is determined whether there is an account on the at least one slave print device, e.g., slave print devices 110a through 110i or 110j, corresponding to the account specified by the master print device 120. If yes, step 288 is implemented of the at least one slave print device, e.g., slave print devices 110a through 110i or 110j, updating or adjusting the total usage values for at least one specified or controlled attribute for the identified account. Following step 218 with the completion of step 288, the system 100a, 100b or 100c may enter a return condition 300 to the system wait condition of step 201 of waiting for the next print job request via continuation point D (see FIG. 2A). If no, step 289 is implemented of the at least one slave print device, e.g., slave print devices 110a through 110i or 110j, informing the master print device 120 that the at least one slave print device, e.g., slave print devices 110a through 110i or 110j, has or have no data base to update and of the at least one slave print device, e.g., slave print devices 110a through 110i or 110j, discarding the temporary account cache information. In a similar manner as with respect to step 288, following step 218 with the completion of step 289, the system 100a, 100b or 100c may enter the return condition 300 to the system wait condition of step 201 of waiting for the next print job request via continuation point D (see FIG. 2A).

Referring back to FIG. 3A and to decision step 273, if it is determined that the originating print device(s), e.g., slaves 110a through 110i or 110j, or master 120, is not designated as a master print device, then the originating print device(s), e.g., slaves 110a through 110i or 110j, was/were a slave print device(s). Furthermore, decision step 276 is implemented of determining if the master is a print device, e.g., master print device 120. If yes, step 278 is implemented by transferring the "accounting data structure" to the master print device, e.g., master print device 120. If no, step 280 is implemented by transferring the "accounting data structure" to the server, e.g., server 130 or 130'. Following step 278 or 280, step 236 or 244 may be implemented by the master print device 120 updating its own database or by the server 130 or 130' updating its own database, respectively.

Referring now to FIG. 3B, step 236 (or step 244) includes step 290 of the master print device, e.g., master print device 120, (or the server, e.g., server 130 or 130'), receiving the "accounting data structure" from the at least one slave print device, e.g., slave print devices 110*a* through 110*i* or 110*j*, wherein the at least one slave print device initiates updating of the master print device 120 (or server 130 or 130'). Additionally, step 236 (or step 244) includes step 292 of identifying in the master (or server) database the account corresponding to the account identification in the "accounting data structure", and further includes step 294 of updating or adjusting the total usage values for at least one specified or controlled attribute for the identified account. Following step 236 (or step 244) with the completion of step 294, the system 100*a*, 100*b* or 100*c* may enter the return condition 300 to the system wait condition of step 201 of waiting for the next print job request via continuation point D (see FIG. 2A).

Returning to FIG. 3A, following step 236 (or step 244), step 282 may be implemented of transferring the "accounting data structure" to all slave print devices having a database, except for the slave print device at which the print job request was initiated or originated, e.g., slave print devices 110*a* through 110*d*, 110*i* or through 110*j*. Following step 282, step 218' may be implemented by the at least one slave print device, e.g., slave print devices 110*a* through 110*i* or 110*j*, updating its own database, e.g., the at least one database of the at least one slave print device, e.g., slave print devices 110*a* through 110*d*. Step 218' is analogous to step 218 described above with respect to FIG. 3B, except that the database updating routine is performed on the slave print devices other than the slave print device at which the print job request was initiated or originated. Upon completion of step 218', the system 100*a*, 100*b* or 100*c* may enter the return condition 300 to the system wait condition of step 201 of waiting for the next print job request via continuation point D (see FIG. 2A).

Based on the foregoing description, it can be appreciated that the present disclosure relates to a distributed system having a network of print devices which employ a master-slave approach to synchronizing or updating print job user record databases (containing user information related to authentication, authorization, and accounting) on an individual print device in the case where the print device can host a database, and a corresponding method thereof. One of the print devices is designated the master print device, while the other print devices are designated as the slave print devices.

It can also be appreciated that the present disclosure relates also to a distributed system having a network of print devices which also employ a master-slave approach to synchronizing or updating print job user record databases (containing user information related to authentication, authorization, and accounting) on an individual print device in the case where the print device can host a database, and a corresponding method thereof. However, instead of the master being a print device, the master is now a server. The slaves are all print devices. The interaction logic between the master and slaves is the same as for the system described above.

Furthermore, it can be appreciated as well that the present disclosure may also relate to a distributed system wherein the print devices do not have the capability to host a database by configuring the master to host the entire database, while the slaves merely act as a cache for temporary account information or accounting data stored only for the duration of the session that is being run, and a corresponding method thereof.

Those of ordinary skill in the art will recognize that, and understand how, a distributed system may be constructed wherein a master server is configured in a hierarchical manner overseeing more than one master printer device wherein each of the master printer devices in turn oversees two or more slave printer devices, wherein the slave printer devices may or may not have a database. The embodiments are not limited with respect to the hierarchical arrangement of servers, master print devices and slave print devices.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A system for updating at least one database, the system comprising:
a first slave print device having at least one different corresponding database, the first slave print device configured to process a print job based on the user identity of an associated account and dynamically update the at least one different database to create a temporary account when receiving a request for a print job from a user that does not have any associated account on the at least one corresponding database;
at least one of a master print device having the at least one database and a server having the at least one database;
at least one network accessing mechanism,
wherein the at least one network accessing mechanism communicates with the first slave print device and with the at least one of the master print device and the server via a network for administration of the at least one database;
wherein the first slave print device is configured to requests a user record having user information that is based on the user identity that corresponds to the associated account, wherein the user information of the record includes information related to authentication, authorization, and accounting from the at least one database of the at least one of the master print device and the server, and to initiate updating of the at least one database of the at least one of the master print device and the server;
wherein the at least one of the master print device and the server is configured to initiate an update of the at least one different database of the first slave print device; and
wherein the at least one of the master print device and the server is configured to initiate updating of at least one different database of a second slave print device after the first slave print device initiates updating of the at least one database of the at least one of the master print device and the server.

2. The system according to claim 1, wherein
the system is configured wherein upon a user requesting a print job at the first slave print device, and
upon receiving the user record, the first slave print device creates the temporary account with temporary account information for the print job requested from the user that does not have any associated account on the at least one different database.

3. The system according to claim 2, wherein the temporary account information includes information of authentication data for the user and usage updating data that includes allowed quotas for controlled attributes, prior usage on the first slave print device and total usage across all print devices connected on the network.

4. The system according to claim 2, wherein
the first slave print device processes the print job and initiates updating of the at least one of the at least one database of the master print device and the at least one database of the server.

5. The system according to claim 4, wherein following the first slave print device processing the print job and initiating updating of the at least one of the at least one database of the master print device and the at least one database of the server, the first slave print device discards the temporary account information.

6. The system according to claim 5, wherein prior to the first slave print device discarding the temporary account information, the first slave print device informs the at least one of the master print device and the server that the first slave print device has no database to update.

7. The system according to claim 4, wherein the updating of the at least one of the at least one database of the master print device and the at least one database of the server is performed by adjusting device usage counters and total usage counters for specified attributes based on the user identity.

8. The system according to claim 1, wherein the at least one first one slave print device processes the print job and updates the at least one database of the first slave print device.

9. The system according to claim 8, wherein following the at first slave print device processing the print job and updating the at least one database of the first slave print device, the first slave print device initiates updating at least one of the at least one database of the master print device and the at least one database of the server.

10. The system according to claim 8, wherein the updating of the at least one database of the at least one slave print device is performed by adjusting device usage counters and total usage counters for specified attributes based on the user identity.

11. The system according to claim 1, wherein
the system is configured wherein upon a user requesting a print job at the master print device,
the master print device processes the print job and updates the at least one database on the master print device.

12. The system according to claim 11, wherein upon the master print device processing the print job and updating the at least one database on the master print device, the master print device initiates updating of the first slave having the database with the account to correspond to an account residing in the master print device.

13. A method for updating at least one database, the method comprising:
providing at least one slave print device having at least one corresponding database, the at least one slave print device configured to process a print job based on the user identity of an associated account and dynamically update the at least one corresponding database to create a temporary account when receiving a request for a print job from a user that does not have any associated account on the at least one corresponding database;
providing at least one of a master print device having the at least one database and a server having the at least one database; and
providing at least one network accessing mechanism, wherein the at least one network accessing mechanism communicates with the at least one slave print device and with the at least one of the master print device and the server via a network for administration of the at least one database;
wherein the at least one slave print device is configured to requests a user record having user information that is based on a user identity that corresponds to an associated account, wherein the user information of the record includes information related to authentication, authorization, and accounting from the at least one database of the at least one of the master print device and the server, and to initiate updating of the at least one database of the at least one of the master print device and the server;
wherein the at least one of the master print device and the server is configured to initiate an update of the at least one database of the at least one slave print device; and
wherein the at least one of the master print device and the server is configured to initiate updating of the at least one database of the remaining at least one slave devices after a first of the at least one slave devices initiates updating of the at least one database of the at least one of the master print device and the server.

14. The method according to claim 13, further comprising a user requesting a print job at the at least one slave print device, and
upon receiving the user record, the at least one slave print device creates the temporary account with temporary account information for the print job requested from the user that does not have any associated account on the at least one corresponding database.

15. The method according to claim 14, wherein the temporary account information includes information of authentication data for the user and usage updating data that includes allowed quotas for controlled attributes, prior usage on the first slave print device and total usage across all print devices connected on the network.

16. The method according to claim 14, further comprising:
the at least one slave print device processing the print job and initiating updating of the at least one of the at least one database of the master print device and the at least one database of the server.

17. The method according to claim 16, wherein following the at least one slave print device processing the print job and initiating updating the at least one of the at least one database of the master print device and the at least one database of the server, further comprising the at least one slave print device discarding the temporary account information.

18. The method according to claim 17, wherein prior to the at least one slave print device discarding the temporary account information, the at least one slave print device informs the at least one of the master print device and the server that the at least one slave print device has no database to update.

19. The method according to claim 16, wherein the updating of the at least one of the at least one database of the master print device and the at least one database of the server is performed by adjusting device usage counters and total usage counters for specified attributes.

20. The method according to claim 13, the method further comprising:
the at least one slave print device processing the print job and updating the at least one database of the at least one slave print device.

21. The method according to claim 20, wherein following the at least one slave print device processing the print job and updating the at least one database of the at least one slave print device, the method further comprises:

at least one slave print device initiating updating of at least one of the at least one database of the master print device and the at least one database of the server;

updating the at least one database of the at least one of the master print device and the server; and the at least one of the master print device and the server initiating updating of the at least one database of the remaining slave devices.

22. The method according to claim 20, wherein the updating of the one of the at least one database of the at least one slave print device is performed by adjusting device usage counters and total usage counters for specified attributes.

23. The method according to claim 13, further comprising: a user requesting a print job at the master print device, and the master print device processing the print job and updating the at least one database on the master print device.

24. The method according to claim 23, wherein upon the master print device processing the print job and updating the at least one database on the master print device, the method further comprises:

the master print device initiating updating the at least one database of the at least one slave print device having a database with an account corresponding to an account residing in the master print device.

* * * * *